United States Patent [19]

Katsuta et al.

[11] Patent Number: 4,797,946

[45] Date of Patent: Jan. 10, 1989

[54] INFORMATION RECORD/RETRIEVAL DEVICE

[75] Inventors: Yuji Katsuta, Yamatokoriyama; Sumio Kita; Sakuharu Takano, both of Nara; Hiroshi Kamada, Yamatokoriyama, all of Japan

[73] Assignee: Sharp Kabushiki Kaisha, Osaka, Japan

[21] Appl. No.: 940,411

[22] Filed: Dec. 11, 1986

[30] Foreign Application Priority Data

Dec. 11, 1985 [JP] Japan .................................. 60-278451
Dec. 11, 1985 [JP] Japan ............................ 60-190678[U]

[51] Int. Cl.⁴ .............................................. G06K 9/00
[52] U.S. Cl. ....................................... 382/61; 235/375
[58] Field of Search .................... 382/61, 56; 235/375, 235/385, 425

[56] References Cited

U.S. PATENT DOCUMENTS

| 3,914,578 | 10/1975 | Bigelow et al. | 235/375 |
| 4,157,783 | 6/1979 | Muster et al. | 382/61 |
| 4,264,808 | 4/1981 | Owens et al. | 235/375 |
| 4,283,621 | 8/1981 | Pembroke | 235/375 |
| 4,408,181 | 10/1983 | Nokayama | 382/61 |
| 4,555,803 | 11/1985 | Hirose | 382/61 |
| 4,686,704 | 8/1987 | Kamada et al. | 382/61 |

*Primary Examiner*—Leo H. Boudreau
*Attorney, Agent, or Firm*—Birch, Stewart, Kolasch & Birch

[57] ABSTRACT

A information record/retrieval device registers information by storing retrieval information formed thereon and searches desired information by using the stored retrieval information. Retrieval information is formed in a specified format which can be entered through an image input device which feeds image information to a control processing unit.

4 Claims, 3 Drawing Sheets

INFORMATION RECORD/RETRIEVAL DEVICE

BACKGROUND OF THE INVENTION

This invention relates to an information record/retrieval device for controlling document files or the like, and more particularly to an information input and output device for sheet material for inputting and outputting information written on sheet material, and further particularly to a device capable of inputting and outputting OMR (Optical Mark Reader) sheets and OCR (Optical Character Reader) sheets, same as the originals, and reading marks or characters optically.

Conventionally, as a device for controlling files of documents occurring in a hugh volume, there is an information record/retrieval device for registering the information related to documents by forming specific retrieval information data on each document, and searching desired information from the registered retrieval information.

In such information record/retrieval device, the retrieval information is input through a keyboard, and if there is a huge volume of retrieval information, it took a long time for this work.

There are also presented electronic files or the like for reading the image information of an original document which is recorded in sheet material, and the electronic files can also read the content of OMR sheets or OCR sheets.

However, in such electronic files, the contents to be written in the sheet materials or OMR sheet or OCR sheet could not be easily made or altered because these sheet materials are made of special paper printed in a specific color.

SUMMARY OF THE INVENTION

It is hence a primary object of this invention to provide an information record/retrieval device in which the retrieval information is compiled using a specified format, and this retrieval information is entered and registered by an image input means for feeding image information such as an original document.

It is another object of this invention to present an information input/output device for sheet material capable of easily changing OMR sheets or OCR sheets.

This invention registers information by attaching a specific retrieval information, and searches desired information by using this retrieval information, and makes it possible to enter the retrieval information formed in a specified format through an image input means for feeding image information.

According to other embodiment, this invention feeds and delivers the information written on a sheet material, comprising an image input device capable of reading the image, marks or characters written in the original, OMR sheet or OCR sheet, a sheet generating device for creating the content of an OMR sheet or OCR sheet, and an image output device for outputting the OMR sheet or OCR sheet created in the sheet generating device as well as the image fed through said image input device.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

This invention is described in further detail hereinafter while referring to some of its embodiments and the accompanying drawings.

Figure 1:
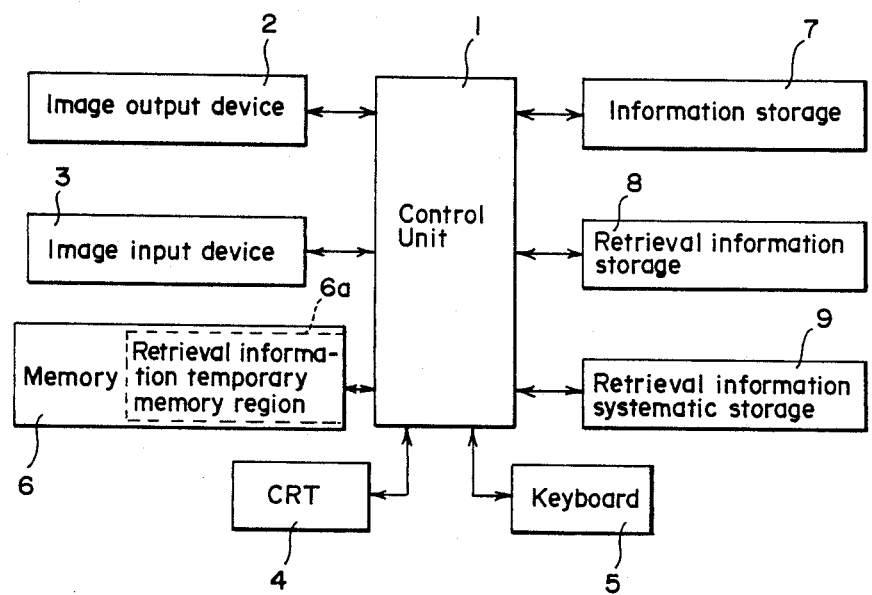
FIG. 1 is a block diagram showing a first embodiment of an information record/retrieval device of this invention.

FIG. 1 is a block diagram showing an information record/retrieval device of this invention.

This information record/retrieval device is controlled by a control unit 1 comprising a CPU.

Numeral 2 denotes an image output device for outputting image information, 3 is an image input device for inputting image information, 4 is a CRT, and 5 is a keyboard. The keyboard 5 contains a registration execution key, retrieval execution key, printout key among others.

The information input through the image input device 3 enters a memory 6 through the control unit 1. This memory 6 contains a retrieval information temporary memory region 6a for temporarily storing the retrieval information. The control unit 1 is also connected, besides the memory 6, to an information storage 7 classified according to the contents to be stored, a retrieval information storage 8, and a retrieval information systematic storage 9.

Figure 2:
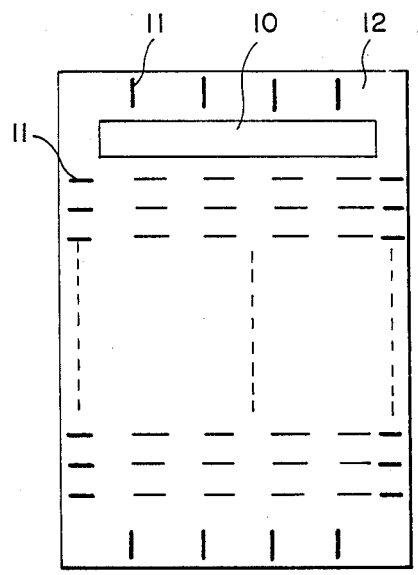
FIG. 2 is an example to show a sheet material to which retrieval information is attached.
Figure 3:
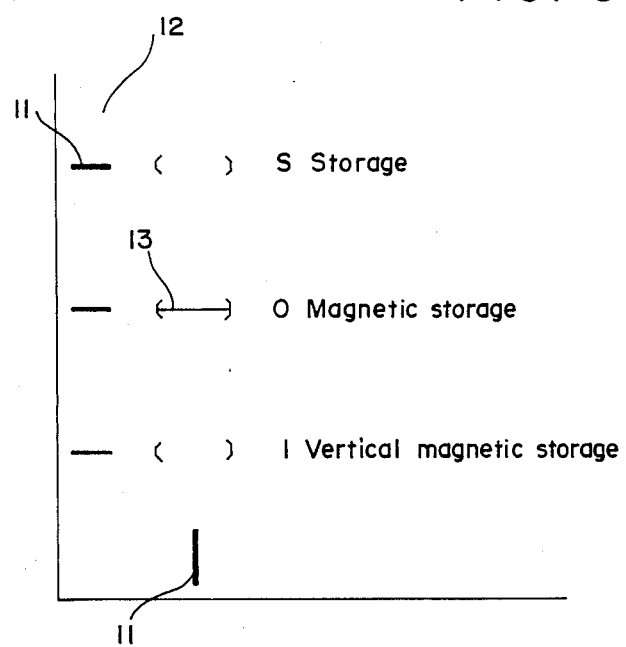
FIG. 3 is a partially magnified view of the same sheet.

In the retrieval information temporary memory region 6a, the content written of a title column 10 in a sheet material 12 (see FIG. 2 and FIG. 3) on which retrieval information is formed is recognized, and a mark (information) 13 in a specified form is stored temporarily. In this embodiment, the sheet material 12 in which retrieval information is formed has timing marks 11 provided at specified intervals, and a bar mark 13 is provided as retrieval information. This mark is, for example in FIG. 3, the information showing that document data is auxiliarily stored in any one of storage, magnetic storage and vertical magnetic storage.

The information storage 7 is a storage used in retrieval, and when an amount of necessary retrieved information is input from the keyboard 5, the image information corresponding to the retrieval information is written into the memory 6 from the information storage 7, and it is displayed on CRT 4 at the same time. The retrieval information storage 8 is intended to store the retrieval information written in the retrieval information temporary memory region 6a when the registration execution key is actuated in the keyboard 5, or when a retrieval information sheet (not shown) is fed through the image input device 3, and the registration job is over when the retrieval information is written into this retrieval information storage 8. The retrieval information systematic storage 9 systematically stores the entire retrieval information, one item of which specified by the mark 13 is written into the retrieval information temporary memory region 6a.

The registration operation in this information record/retrieval device is explained below.

The information input from the image input device 3 is stored in the memory 6 and is displayed in the CRT 4. The control unit 1 judges whether the information stored in the memory 6 is of specified format or not, that is, whether the timing mark 11 is present in the specified position or not, and if the information is of specified format, the existing position of mark 13 is calculated, and the retrieval information corresponding to the calculated position is read out from the retrieval information systematic storage 9, and is written into the retrieval information temporary memory region 6a of the memory 6. On the other hand, if the information stored in the memory 6 is not of specified format (that is, an original document), this image information is fed into the information storage 7 by the control of the control unit 1.

Incidentally, if the title name written in the title column 10 is recognized by the control unit 1, this title name is written into the retrieval information temporary memory region 6a of the memory 6. However, if the registration execution key is operated on the keyboard 5, or when a retrieval information input sheet is entered through the image input device 3, it is transferred into the retrieval information storage 8 from the retrieval information temporary memory region 6a of the memory 6, and the registration operation is over.

On the other hand, in retrieval operation, when the retrieval execution key is operated on the keyboard 5, all retrieval information including the retrieval information coinciding with the retrieval information written in the temporary memory region 6a of the memory 6 is read out from the retrieval information storage 8, and is displayed on the CRT 4. Afterwards, when an amount of necessary retrieved information is entered through the keyboard 5, the corresponding image information is transferred into the memory 6 from the information storage 7, and is displayed in the CRT 4 at the same time. If printing is necessary, by operating the printout key on the keyboard 5, the image information may be printed out by the image output device 2.

In this embodiment, meanwhile, if the image input device 3 is designed to allow automatic input of originals, it is also possible to automate the registration operation.

In this way, according to the first embodiment of this invention, retrieval information can be entered through the image input device 3, without input from the keyboard, so that the input time is shortened while the job efficiency is enhanced.

A second embodiment of this invention is described hereinbelow while referring to FIG. 4.

Figure 4:
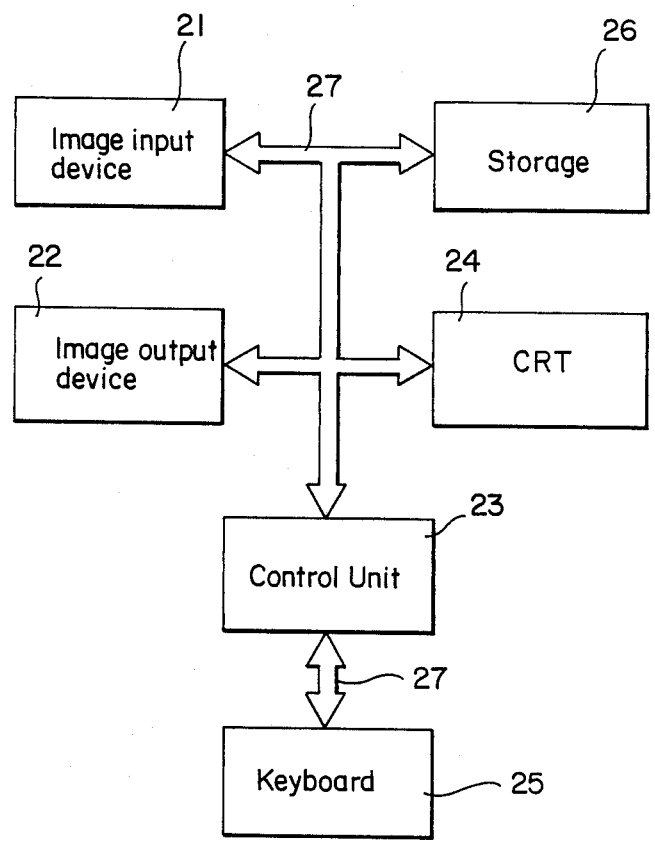
FIG. 4 is a block diagram showing an information input/output device for sheet material as a second embodiment of this invention.

FIG. 4 is a block diagram showing an information input/output device for sheet material according to this invention.

With a control unit 23 having a CPU, an image input device 21, an image output device 22, a CRT 24, a keyboard 25, and a storage 26 are connected by two-way bus lines 27.

The image input device 21 enters the sheet material in which information is loaded, and it is possible to read different types of material by distinguishing the image information of an original, marks of an OMR sheet or characters of an OCR sheet. Input device 21 is composed of an input means for entering the original image, a reading means for reading the marks or characters of OMR sheets or OCR sheets, a judging means for judging whether the sheet material is an original, OMR sheet or OCR sheet, and a control means for controlling the operation of the input means or the reading means depending on the result of the judgment of said judging means.

The image output device 22 output the image information fed through the image input means 21, as well as OMR sheet or OCR sheet created through the keyboard 25.

The control unit 23 controls the entire operation, such as input and output of information written on sheet material, and creation of OMR sheet or OCR sheet.

The CRT 24 displays the data entered through the keyboard 25, or the information fed from the image input device 21. The keyboard 25 generates a specified format for creating OMR sheets or OCR sheets. The storage 26 is a memory unit for storing the input image information.

In the thus constituted information input/output device for sheet material, for example, to create an OMR sheet, a necessary format is generaed by key inputs from the keyboard 25 while displaying on the CRT 4. In this OMR sheet, an identification mark such as a timing mark to be distinguished from other image information, is printed in a specified position on the sheet material.

When an OMR sheet is fed through the image input device 21, it is judged that the timing mark is located at the specified position by said judging means, and this sheet material is identified to be an OMR sheet, and the mark (information) which is the content written in the OMR sheet is read by the reading means. On the other hand, if the timing mark is not found at the specified position, it is judged as original document image information, the input means is operated by the control means, and the original image information is stored in the storage 26. The stored image information, and the content of the OMR sheet or OCR sheet created by the operation of keyboard 25 can be output through the image output device 22 by the operation of the keyboard 25.

In this way, according to the second embodiment of this invention, generation of OMR sheets or OCR sheets may be handled in the in the same manner as the original image information. It is thus easy to create, and the OMR sheets or OCR sheets may be changed easily, too.

While only certain embodiments of the present invention have been described, it will be apparent to those skilled in the art that various changes and modifications may be made therein without departing from the spirit and scope of the present invention as claimed.

What is claimed is:

1. An information record/retrieval device for registering stored information according to retrieval data associated therewith and retrieving desired information by searching the retrieval data register in response to input retrieval data, comprising:

image input means for optically inputting information to be stored and coded retrieval data associated therewith;

information storage means for storing said information;

retrieval storage means for storing retrieval data associated with information stored in said information storage means;

retrieval systematic storage means for storing retrieval data corresponding to coded retrieval data;

image output means for outputting desired information;

display means for displaying input information and output information;

keyboard means for inputting retrieval data and commands for executing a registration operation or a retrieval operation;

memory means for receiving information from said image input means during said registration operation and from said information storage means during said retrieval operation, and for receiving retrieval data from said retrieval systematic storage means in response to the input of coded retrieval data during said registration operation and from said retrieval storage means during said retrieval operation; and central processing unit (CPU) control means for matching stored information with input retrieval data during said retrieval operation and for transferring matched information from said information storage means to said memory means, controlling the output of matched information on said image output means from said memory means, and controlling the operation of information transfer among said image input means, memory means, information storage, retrieval storage, and retrieval systematic storage means.

2. The device of claim 1 wherein said information and coded retrieval data are recorded on optically readable sheets.

3. An information input/output device for storing and generating information recorded on a sheet, comprising:

image input means for reading information recorded on an original document sheet, an OMR (Optical Mark Reader) sheet and an OCR (Optical Character Reader) sheet;

storage means for storing the information read by said image input means;

sheet generating means for creating information in a format to be recorded on an OMR sheet and an OCR sheet; and image output means for outputting information stored in said storage means and information created by said sheet generating means.

4. The device of claim 3, wherein said image input means includes means for judging whether a sheet being read is an original document, an OMR sheet or an OCR sheet;

means for inputting an image of an original document;

means for reading marks of OMR sheets and characters of OCR sheets; and control means responsive to said means for judging for controlling the operation of said means for inputting and means for reading.

* * * * *